(12) United States Patent  
Hellmann et al.

(10) Patent No.: US 7,414,229 B2  
(45) Date of Patent: Aug. 19, 2008

(54) DISPOSABLE MICROWAVE FOOD SHIELD

(76) Inventors: Michael G. Hellmann, 36 Vineyard Way, Mount Sinai, NY (US) 11766-1829; Peter J. Shaw, 125 Eastview Rd., Lake Ronkonkoma, NY (US) 11779-3074

( * ) Notice: Subject to any disclaimer, the term of this patent is extended or adjusted under 35 U.S.C. 154(b) by 80 days.

(21) Appl. No.: 11/134,676

(22) Filed: May 23, 2005

(65) Prior Publication Data

US 2006/0151489 A1    Jul. 13, 2006

Related U.S. Application Data

(60) Provisional application No. 60/641,020, filed on Jan. 4, 2005.

(51) Int. Cl.  
*H05B 6/80* (2006.01)

(52) U.S. Cl. .................................. 219/729; 219/725

(58) Field of Classification Search ................ 219/729, 219/728, 727, 726, 725, 678  
See application file for complete search history.

(56) References Cited

U.S. PATENT DOCUMENTS

| 3,439,587 | A | * | 4/1969 | Sternau | 493/52 |
| 4,303,817 | A | * | 12/1981 | Klement et al. | 219/738 |
| 4,332,091 | A | * | 6/1982 | Bensussan et al. | 34/265 |
| 4,357,513 | A | * | 11/1982 | Kawata et al. | 219/685 |
| 4,801,773 | A | * | 1/1989 | Hanlon | 219/735 |
| 4,814,568 | A | * | 3/1989 | Keefer | 219/728 |
| 4,873,406 | A | * | 10/1989 | Connor | 219/735 |
| 5,015,813 | A | * | 5/1991 | Yamada et al. | 219/748 |
| 5,211,808 | A | * | 5/1993 | Vilardi et al. | 159/6.1 |
| 5,239,153 | A | * | 8/1993 | Beckett | 219/730 |
| 6,386,498 | B1 | * | 5/2002 | Deco | 248/346.01 |
| 6,803,552 | B1 | * | 10/2004 | Irizarry et al. | 219/732 |

* cited by examiner

*Primary Examiner*—Daniel Robinson  
(74) *Attorney, Agent, or Firm*—Alfred M. Walker; Mark E. Bender

(57) ABSTRACT

A disposable microwave food shield for preventing splatter of food onto the interior surfaces of microwave ovens made from absorbent, yet rigid paper material.

4 Claims, 4 Drawing Sheets

0.12 / 3.00

DISPOSABLE MICROWAVE FOOD SHIELD

CROSS-REFERENCE TO RELATED APPLICATIONS

This application is based on our prior provisional application No. 60/641,020 Dated Jan. 4, 2005

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The invention relates generally to devices which are used in food preparation to prevent splatter of the food and also relates generally to disposable products. More specifically, the invention relates to a paper based, disposable shield, which will be used in the preparation of food in a microwave oven, so as to prevent the splatter of food onto the interior surface of the microwave oven.

The use of microwave ovens to prepare meals has become commonplace. That is to say the microwave is no longer used only to reheat beverages or prepared and pre-packaged meals. It is now commonly used for almost all cooking and heating applications from leftovers to complete meals. One of the difficulties in using microwave ovens is the generation of "Hot Spots" due to the lack of uniformity of microwave penetration within the substance being heated. These "Hot Spots" cause one or more small areas of the food being heated to reach a rapid localized boiling point and explode or pop, thereby splattering bits of food onto the interior surface of the microwave oven.

Current methods of reducing "Hot Spots" include rotating turntables which continually rotate the food as to distribute the internal microwave energy. Even with the use of these turntables, the food often splatters leaving the inside of the microwave soiled and in need of cleaning. Furthermore, there are instances where it is necessary to bring the food to a boil, and when such boiling occurs, the microwave oven is likely to be soiled by the splatter of the boiling food.

Currently, the most common method of preventing microwave ovens from being splattered with food is to cover the food being heated with another dish or lid. If an entire dish, such as a casserole, is being prepared, the lid may be used to prevent food splatter. However, it is very common to heat food on a serving dish, plate, bowl or other lidless container. In such cases, another plate is often placed over the open heating dish in order to protect the interior of the microwave. The problem here is that the person now has two dishes to wash from the preparation of a single dish of food. Alternatively, people often place a paper towel or napkin over the food being heated to protect against splatter. The use of the paper towel or napkin is desirable because it is relatively inexpensive to use and can simply be discarded after use. The napkin or paper towel rests on the food and absorbs any splatter caused by the "Hot Spots" or boiling food. The use of the napkin or paper towel, however, results in the undesirable absorption of liquids from the food, such as cheese, creams or sauces. This absorption also causes the paper towel or napkin to stick to the food.

Consequently, there is a need for a device and method for covering food during microwave cooking and heating so as to protect the interior of the microwave from being soiled with splattering food. There is also the need for this device and method of covering food to eliminate the addition of more dirty dishes and not leave paper towels or napkins sticking to the food. This device needs to be inexpensive and easy to use.

BRIEF SUMMARY OF THE INVENTION

The present invention provides a disposable yet rigid shield to be placed over and above the food, covering it, on a serving plate or other lidless dish so as to block the splatter of food and prevent soiling of the interior of the microwave. The device of the present invention is inexpensive (similar in cost to a paper towel) easy to use and disposable.

DETAILED DESCRIPTION OF THE INVENTION

Figure 1:
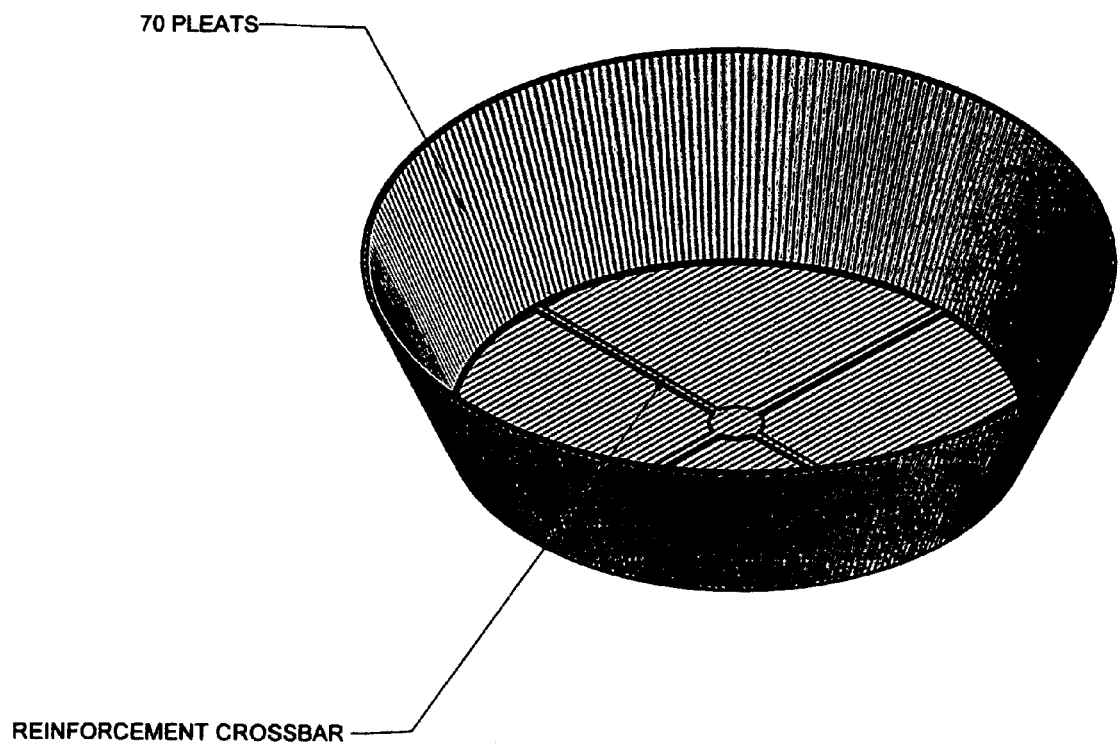
FIG. 1 shows a perspective view of the present invention to show its design.
Figure 2:
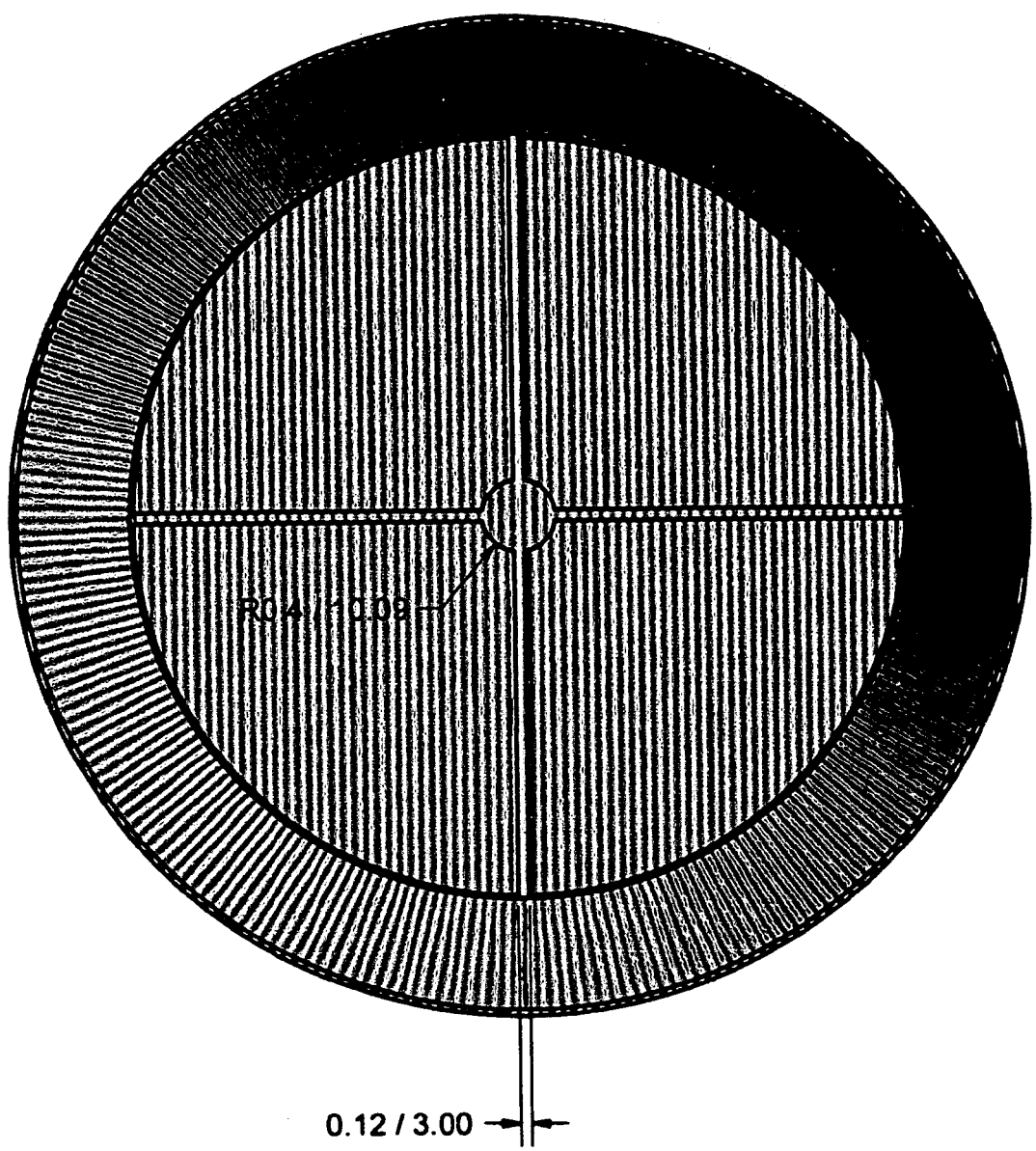
FIG. 2 shows the present invention as viewed from the bottom up. It shows the open bottom, pleated sides, and crossbar reinforced top.

Referring first to FIG. 1, the disposable microwave food shield is preferably made of a substantially circular unitary piece of paper having a reinforced flat upper face and downwardly projecting pleated sides. The pleated sides imparts rigidity and absorbency to the disposable microwave food shield so that it independently maintains its shape when in use. The reinforcement bar at the top prevents the top from sagging onto the food underneath. The disposable microwave food shield has no bottom face (see FIG. 2), but rather is open to allow it to be placed over an open serving dish or container to encompass the food within the interior portion of the disposable microwave food shield.

Figure 3:
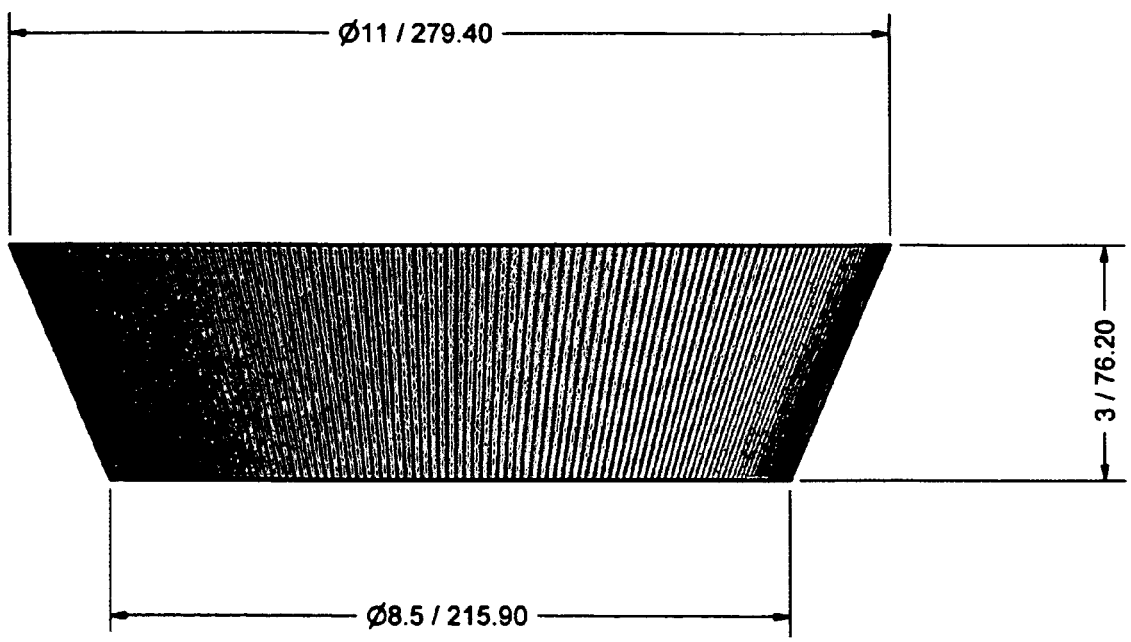
FIG. 3 shows the present invention from the side with some reference dimensions.

Preferably the angle subtended between the side portion and top face may range from approximately 90° to 135°, with the most preferred angle being 112°. Preferably the height of the disposable microwave food shield is between two (2) and six (6) inches, with the most preferred height, shown in FIG. 3, to be three (3) inches. The diameter of the upper face may range from three (3) to twelve (12) inches with the most preferred diameter to be 8.5 inches. The open diameter at the bottom may range from five (5) to fifteen (15) inches with the most preferred diameter to be eleven (11) inches.

Referring now to figure two (2), the disposable microwave food shield is of a conical shape having 70 pleated sides projecting downwardly from the upper face creating the side portion. The upper face also has a four bar crossmember pressed or embossed into it to add rigidity. The bottom of the disposable microwave food shield is open.

Preferably, the material of which the disposable microwave food shield is made of is an absorbent mixture of paper, cotton and synthetic fibers.

Figure 4:
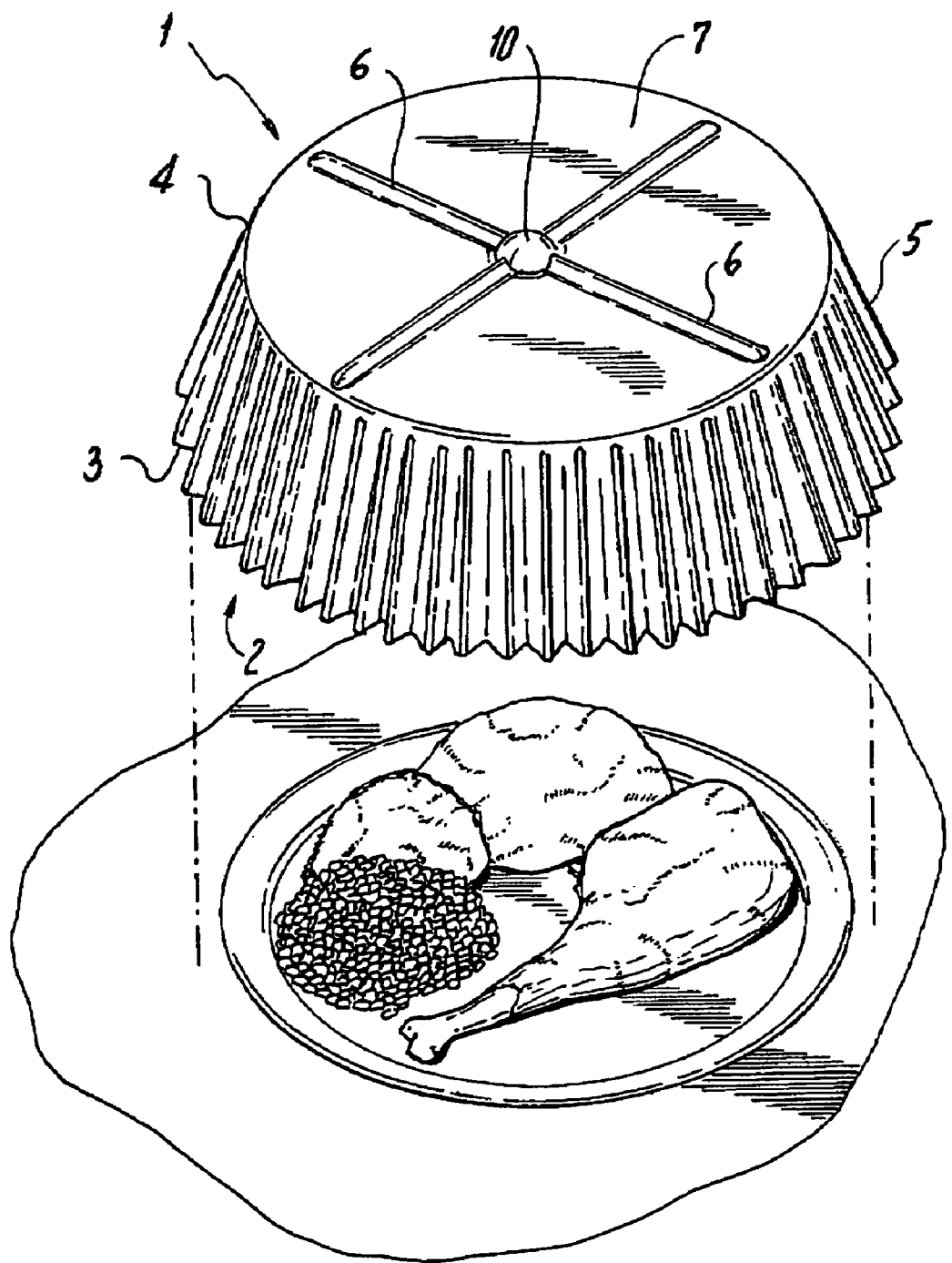
FIG. 4 shows is an exploded perspective view showing the present invention in its normal position as it would be placed over a microwave dish containing food.

As shown in FIG. 4, the food shield is placed over an open serving dish to encompass food within the dish when placed in a microwave over for heating.

We claim as our invention a disposable microwave food shield comprising:

1. A disposable microwave food shield in combination with a microwavable open serving dish, comprising:

said food shield comprising a unitary substantially circular and completely solid upper face, said upper face having at least one reinforcement crossbar embossed into said upper face extending edge to edge along a full diameter of said upper face for preventing sagging of said upper face onto food in said dish;

a substantially conical side portion having an upper edge and a lower edge, said side portion being pleated with undulating downwardly extending top to bottom folded flat non-curved sections, each said section folded linearly upon itself along straight top to bottom fold line corners, for imparting rigidity to said side portion, and said side section projecting substantially downwardly from said circular upper face; providing an unencumbered open bottom; covering food contained within said dish; and said upper face and said side portion being made only of a paper based absorbent material and of sufficient rigidity to remain standing free of support on said dish completely covering said food during micro waving of said food.

2. The disposable microwave food shield of claim 1 wherein said circular upper face has a diameter of between three (3) and twelve (12) inches.

3. The disposable microwave food shield of claim 1 wherein an angle subtended between said upper face and said side portion is from 90° to 135°.

4. The disposable microwave food shield of claim 1 wherein the bottom opening has a diameter of between five (5) and fifteen (15) inches.

* * * * *